United States Patent [19] [11] 4,021,358
Tomono et al. [45] May 3, 1977

[54] TONER FOR DEVELOPING ELECTROSTATIC LATENT IMAGES

[75] Inventors: Makoto Tomono, Hino; Goiti Yamakawa, Hachioji; Akira Inoue, Hirakata; Masahiro Otsuka, Osaka, all of Japan

[73] Assignee: Konishiroku Photo Industry Co., Ltd., Tokyo, Japan

[22] Filed: July 3, 1975

[21] Appl. No.: 592,989

[30] Foreign Application Priority Data

July 12, 1974 Japan .............................. 49-80320

[52] U.S. Cl. .......................... 252/62.1 P; 96/1 SD; 96/1.4; 260/39 P; 260/39 M; 260/67.5; 260/72.5
[51] Int. Cl.² ..................... G03G 9/08; G03G 9/14; C08K 5/34; C08K 5/29
[58] Field of Search .................: ........... 252/62.1 P, 62.1; 260/67.5, 72.5, 72 R, 39 P, 39 M; 96/1.4, 1 SD

[56] References Cited

UNITED STATES PATENTS 2,297,691  10/1942  Carlson .................................. 96/1.4
3,864,296  2/1975  Faessinger ...................... 260/72 R

FOREIGN PATENTS OR APPLICATIONS 1,181,287  2/1970  United Kingdom .............. 252/62.1

Primary Examiner—Mayer Weinblatt
Assistant Examiner—R. Eugene Varndell, Jr.
Attorney, Agent, or Firm—Bierman & Bierman

[57] ABSTRACT

A toner for developing electrostatic images which contains a particular addition condensate and a colorant wherein said addition condensate is present in an amount of from 1 to 100 parts by weight and said colorant in an amount of from 1 to 10 parts by weight of said toner.

4 Claims, No Drawings

TONER FOR DEVELOPING ELECTROSTATIC LATENT IMAGES

This invention relates to a toner for developing electrostatic latent images in electrophotography, electrostatic recording, electrostatic printing and the like.

Electrostatic latent images are generally converted to visible images by a liquid development method in which a member carrying electrostatic latent images is dipped into a liquid developer comprising a petroleum solvent having an insulating property and fine powders of a dye and a fixing resin and the like dispersed or dissolved in the petroleum solvent. A dry development method can be used in which a developer comprising a fine particle toner including a natural or synthetic resin, a pigment and a charge controlling agent such as a dye and a carrier composed of glass bead or iron powder is used. The dry development method is divided into the cascade development method, the fur brush development method, the magnetic brush development method, the impression development method and the powder cloud development method. This invention relates to a toner used in the dry development method.

Toners for use in the dry development method which have heretofore been used are generally prepared by melting and dispersing a pigment such as carbon black and a charge controlling agent such as a dye in a natural or synthetic thermoplastic resin and pulverizing the product into a fine powder having a size of 5 to 20 $\mu$.

As the charge controlling agent used for the dry development, there are known, for example, positive charge controlling agents dislcosed in Japanese Patent Publication No. 2427/66 such as Fet Schwarz HBN (C. I. No. 26150 ), Nigrosine ( C. I. No. 50415 ), Sudan Teak Schwartz BB ( C. I. No. 26150 ), Brilliant Spirit Schwarz TN ( manufactured by Farbenfabriken Bayer ) and Savon Schwarz ( manufactured by Farberk Hoechst ), and negative charge controlling agents such as Ceres Schwarz (R) G ( manufactured by Farbenfabriken Bayer ), Chromogene Schwarz ETCO ( C. I. No. 14645 ) and Azo Oil Black R (R) ( manufactured by National Aniline ).

The chemical structures of these dyes are very complex and they are inferior in stability. For example, they are readily decomposed or degraded by friction and impact, changes in the temperature and humidity conditions, electric shocks, irradiation of light and the like. Additionally, they decompose at about 150° C. during the melt kneading operation. Accordingly, their charge controlling characteristics are readily lost.

Toners, including these as charge controlling agents, are used as developers for copying machines. However, as the number of copies increases, the dyes are decomposed or degraded and the properties required for the toners are lost.

Furthermore, since it is very difficult to disperse or dissolve these dyes uniformly in thermoplastic resins, charge controlling agents are contained in various amounts in toner particles. Accordingly, there is brought about a defect that quantities of charges caused by friction between the toner and the carrier are not uniform. Therefore, many attempts have heretofore been made to attain uniform dispersion or dissolution of dyes as charge controlling agents in resins. More specifically, a basic Nigrosine dye used as the positive charge controlling agent is employed in the form of a salt with a higher fatty acid so as to improve its compatibility with a resin. However, the unreacted fatty acid often adheres to the surface of the carrier to reduce the flow and development characteristics of the developer. This cause degradation of the image quality. Further, there has been adopted a method in which a dye powder is mixed mechanically in advance with a resin powder to effect so-called premixing. The mixture is then melted and kneaded by means of a kneader to disperse or dissolve the dye into the resin. However, a satisfactory stable toner which is free of non-uniform charge polarity can hardly be obtained even by adopting such method.

In case a toner containing a dye is lacking in chemical structural stability and inferior charge property is employed as the developer for electrophotography, there is brought about a non-uniform quanity of charge generated on surfaces of toner particles by the friction between the toner and carrier. This results in such troubles as fogging, fatigue of the developer, and contamination of the inside of a copying machine by scattering of the toner. When such toner is used for a copying machine of the recycled transfer type in which the operations of charging, light exposure, development and transfer are conducted repeatedly, the efficiency of transfer of the toner images is very low and because of toner-scatter the surface of a photographic sensitive material is covered with the toner. Accordingly, large numbers of copies are made impossible due to the reduction of sensitivity, promotion of fatigue and increase of fog. Moreover, the scattered toner in the copying machine reduces the electrical and mechanical functions in the machine and shortens the life of the machine. Further, during storage or transportation of toners, cohesion of toner particles is readily caused by humidity, whereby agglomerates of the toner particles are formed and the toners become unapplicable. This is another great defect of conventional developers.

It is therefore a primary object of this invention to provide a toner for developing electrostatic latent images which is improved so as to overcome the foregoing defects involved in conventional developers. Another object of this invention is to provide a toner which has a uniform charge and is free from such defects as fogging, scattering of or agglomeration of the toner and fatigue of the developer. Still another object of this invention is to provide a stable toner for developing electrostatic latent images in which a resin is used as a charge controlling agent instead of a dye. Still another object of this invention is to provide a toner for color electrophotographic development which has a stable positive charge controlling property.

We have found that the foregoing objects can be attained by a toner for developing electrostatic latent images comprising an addition condensate having in the main chain structural units represented by the following general formula

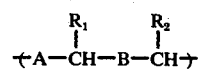

wherein $R_1$ and $R_2$ are a hydrogen atom or a alkyl, aryl, aralkyl or alkenyl group, A is a group

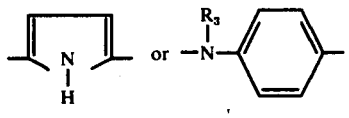

in which $R_3$ has the same definition as $R_1$ and $R_2$, and B is a group

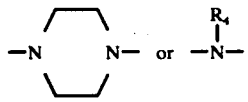

in which $R_4$ has the same definition as $R_1$ $R_2$.

In this toner, by using a stable resin as the charge controlling agent instead of conventional unstable dyes, such defects as non-uniform charge polarity, fogging, scattering and agglomeration of the toner, and fatigue of the developer caused by these defects can be overcome. This effect is especially conspicuous when the toner is used for a copying machine of the recycled transfer type. More specifically, even if the copying operation operates repeatedly many times, images having a good quality equal to the quality of the initially obtained images can be continuously obtained. Further, when this toner is used for color electrophotography, cyan, magenta and yellow dyes having most preferred spectral characteristics can be freely chosen and used with no attention being paid to a charge controlling dye. Thus, when the specific resin of this invention is used as the charge controlling agent, very excellent effects and advantages can be attained in forming images according to electrophotography.

As typical instances of the resin to be incorporated in the toner of this invention, there can be mentioned resins having the following structural units:

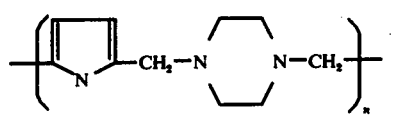

(1)

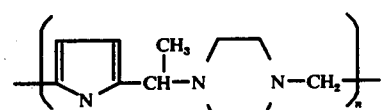

(2)

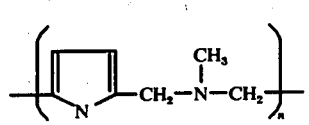

(3)

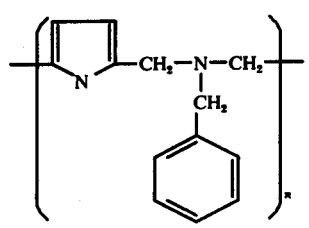

(4)

-continued

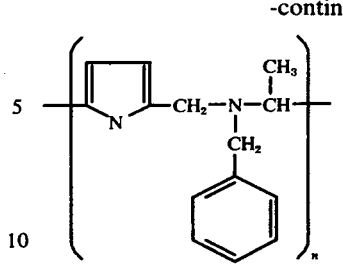

(5)

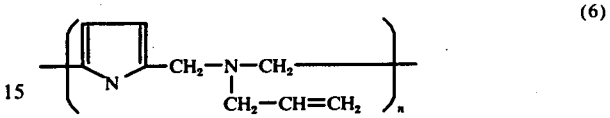

(6)

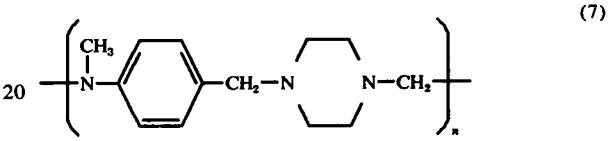

(7)

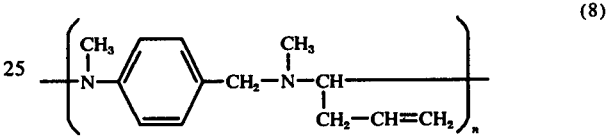

(8)

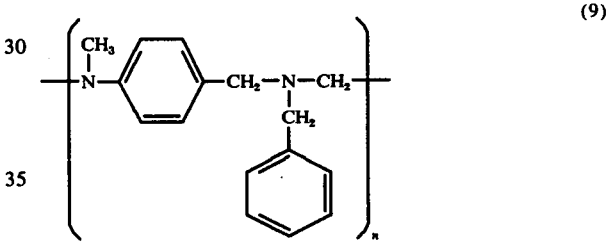

(9)

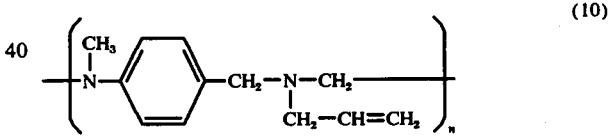

(10)

The resin to be incorporated into the toner of this invention is a polyamine resin obtained by condensing a nitrogen-containing compound having in the molecule an active hydrogen atom with a aldehyde compound and a secondary amine. When this resin is incorporated into a toner, a positive charge controlling property is given to the toner. This resin can be prepared, for example, in the manner mentioned below.

A predetermined amount of a nitrogen-containing compound having an active hydrogen atom is charged in a reaction vessel. A solvent such as water, methyl alcohol and N,N-dimethyl-formamide is added to dissolve the nitrogen-containing compound therein. Separately, a solution of an amine and formalin in the same solvent as above is prepared ( when a free amine is used, a certain amount of acetic anhydride is added ). This solution is added dropwise for a certain period of time to the solution of the nitrogen-containing compound, and the mixture is allowed to react at a certain temperature for several hours. The resulting reaction mixture is poured into an aqueous solution of 2 to 3 % of alkali, and the intended resin is obtained as a precipitate.

In the toner of this invention, such characteristics as the durability of the developer, the abrasion resistance and the fixing property as well as the positive charge controlling property can be improved by selecting conditions for the preparation of the resin and the structural units of the resin appropriately.

Examples of the synthesis of the toner resin of this invention will now be described.

SYNTHESIS EXAMPLE 1
(Synthesis of Compound 1)

A four-neck flask having a capacity of 200 ml equipped with a stirrer, a thermometer, a reflux cooler and a dropping funnel was charged with 0.1 mole of piperazine dihydrochloride monohydrate, and 50 ml of water was added thereto to form a solution. Then the solution was cooled to 0° C. and a 37 % aqueous solution of formalin was added dropwise to the solution at 0° to 5° C. so that 0.2 mole of formalin was added. The so obtained solution was designated as liquid A.

Then, a four-neck flask having a capacity of 300 ml was charged with 0.1 mole of pyrrole, and 20 ml of methyl alcohol was added thereto and the mixture was cooled to 0° C. to obtain liquid B.

The liquid A was added dropwise to liquid B over a period of 1 hour, and the mixture was allowed to react at 0° to 5° C for 2 hours under agitation and then at 20° C. for 20 hours under agitation.

The reaction mixture was poured into a 3% aqueous solution of sodium carbonate, and the formed precipitate was recovered by filtration, washed with water 2 or 3 times and dried. The recovered solid was dissolved in chloroform and reprecipitated with diethyl ether to obtain the intended resin in a yield of 35 %.

SYNTHESIS EXAMPLE 2
(Synthesis of Compound 3)

Liquid A was prepared in the same manner as in Synthesis Example 1 except that instead of piperazine dihydrochloride monohydrate, 0.1 mole of methylamine monohydrochloride was added and dissolved in 50 ml of water. In the same manner as described in Synthesis Example 1, liquid B, namely a solution of pyrrole in methyl alcohol, was prepared. The liquid A was added dropwise to the liquid B over a period of 1 hour, and the mixture was allowed to react under agitation at 0° to 5° C. for 2 hours and then at 35° C. for 50 hours. The reaction mixture was poured in a 3 % aqueous solution of sodium carbonate, and the resulting white precipitate was recovered by filtration, washed with water 2 or 3 times and dried.

The recovered solid was dissolved in benzene and reprecipitated with n-hexane to obtain the intended resin in a yield of 55 %. The melting point of the thus obtained resin was 104° to 106° C.

SYNTHESIS EXAMPLE 3
(Synthesis of Compound 4)

Liquid A was prepared in the same manner as in Synthesis Example 1 except that instead of piperazine dihydrochloride monohydrate, 0.1 mole of benzylamine monohydrchloride was added and dissolved in 50ml of water.

Liquid B, namely a solution of pyrrole in methyl alcohol, was prepared in the same manner as in Synthesis Example 1.

The liquid A was added dropwise to the liquid B over a period of 1 hour, and the mixture was allowed to react under agitation at 0° to 5° C. for 2 hours and then at 35° C. for 40 hours.

The reaction mixture was poured into a 3 % aqueous solution of sodium carbonate, and the resulting white precipitate was recovered by filtration, washed with water 2 or 3 times and dried. The recovered solid was dissolved in dimethyl formamide and re-precipitated with methyl alcohol to obtain the intended resin in a yield of 58 %.

The melting point of the thus obtained resin was 176° to 179° C.

SYNTHESIS EXAMPLE 4
(Synthesis of Compound 7)

Liquid A was prepared in the same manner as in Synthesis Example 1, and liquid B was prepared in the same manner as in Synthesis Example 1 except that instead of pyrrole, 0.1 mole of N-monomethylaniline was dissolved in 50ml of dimethyl-formamide.

Then the liquid A was added dropwise to the liquid B over a period of 1 hour, and the mixture was allowed to react under agitation at 0° to 5° C. for 2 hours and then at 35° C. for 50 hours. The reaction mixture was poured into a 3 % aqueous solution of sodium carbonate, and the resulting white precipitate was recovered by filtration, washed with water 2 to 3 times and dried. The recovered solid was dissolved in benzene and reprecipitated with n-hexane to obtain the intended resin in a yield of 60 %.

The melting point of the thus obtained resin was 165° to 170° C. Intrinsic viscosities [$\eta$] of the above-mentioned exemplified compounds are shown in the following table.

Table

| Compound No. | Solvent | Intrinsic Viscosity [$\eta$] 25° C |
|---|---|---|
| 1 | Chloroform | 0.03 |
| 2 | Chloroform | 0.03 |
| 3 | Benzene | 0.04 |
| 4 | Dimethylformamide | 0.10 |
| 5 | Dimethylformamide | 0.12 |
| 6 | Benzene | 0.06 |
| 7 | Benzene | 0.20 |
| 8 | Benzene | 0.05 |
| 9 | Dimethylformamide | 0.14 |
| 10 | Benzene | 0.09 |

The toner of this invention for developing electrostatic latent images is obtained by incorporating as one component of the toner one or more of the above-mentioned toner resins. Since the toner resin of this invention is excellent in physical properties as the resin for a toner, the toner can be formed by only the resin.

According to need, this resin may be used in combination with other resins, for example, a thermoplastic resin having a glass transition point higher than 40° C., such as vinyl resins, non-vinyl resins and mixtures thereof. As the vinyl resin, there can be mentioned homopolymers and copolymers of olefins such as ethylene, propylene and butylene; vinyl esters of carboxylic acids such as vinyl acetate, vinyl propionate, vinyl benzoate and vinyl butyrate; vinyl halides such as vinyl chloride, vinyl bromide and vinyl iodide; esters of vinylcarboxylic acids such as methyl acrylate, ethyl acrylate, butyl acrylate, dodecyl acrylate, n-octyl acrylate, 2-chloroethyl acrylate, phenyl acrylate, methyl methacrylate, ethyl methacrylate and butyl methacrylate; vinyl ethers such as vinyl methyl ether, vinyl ethyl ether and vinyl isobutyl ether; vinyl ketones such as vinyl methyl ketone, vinyl hexyl ketone, and methyl isopropenyl ketone; and N-vinyl compounds such as N-vinylpyrrole, N-vinylcarbazole, N-vinylindole and N-vinylpyrrolidone.

Mixtures of these homopolymers and copolymers can also be employed. As the non-vinyl resin, there can be mentioned coumarone-indene resins, rosin-modified phenolic resins, oil-modified epoxy resins, polyether resins and mixtures thereof. When these resins are used for toners, it is preferred that the molecular weight be about 1,000 to about 100,000.

In the toner of this invention for developing electrostatically charged images, a suitable pigment or dye can optionally be used as a colorant. As such colorant, there can be mentioned carbon black, Nigrosine dyes, Aniline Blue, Chalco Oil Blue, Chrome Yellow, Ultramarine Blue, Du pont Oil Red, Quinoline Yellow, Methylene Blue Chloride, Malachite Green Oxalate, lamp black, Rose Bengale, and Mixtures thereof.

The toner of this invention for developing electrostatically charged images is prepared, for example, in the following manner:

A Polyamine resin having in the main chain a charge controlling polar group, such as mentioned above, is sufficiently mixed with a pigment or dye as the colorant optionally with a vinyl resin or non-vinyl resin by means of a ball mill or other suitable mixing machine. Then, the mixture is melted and kneaded by using a heating roll sufficiently to disperse or dissolve the pigment or dye in the resin component. The kneaded mixture is then cooled solidified, pulverized and sieved to obtain a toner having an average particle size of 5 to 20μ.

The thus prepared toner is mixed with a carrier such as glass bead and iron powder, and the thus obtained developer can be used for developing electrostatic latent images in any of electrophotography, electrostatic recording, electrostatic printing and the like. This product has the following excellent effects.

The quantity of the triboelectric charge is uniform among toner particles, and the quantity of the charge can be controlled very easily. Further, since the degradation is not caused during use, the quantity of the triboelectric charge is not increased or reduced during use. Accordingly, the toner of this invention is very stable. Therefore, the above-mentioned problems such as fogs during development, scattering of the toners and contamination of an electrophotographic photosensitive material or a copying machine can be eliminated. Furthermore, since the resin of this invention, having a charge controlling group has very excellent physical properties, the toner of this invention can indure a long storage time without the fatal defects associated with conventional toners; namely cohesion and agglomeration of toner particles or cold flow. The resulting toner images are excellent in the abrasion resistance, fixing property and adhesion.

These excellent effects of the toner of this invention are enhanced when it is used for the recycled transfer type reproduction process where the operations of charging, light exposure, development and transfer are repeated. Moreover, since a charge controlling dye is not used, no color trouble is caused by such dye and when the toner of this invention is used for color electrophotography, color images, excellent in the hue, can be obtained.

In preparing the toner of this invention, the mixing ratio of the components is changed appropriately depending on the intended use, the kind of the carrier and other factors. In general, it is preferred that 1 to 100 parts of the polyamine resin of this invention are compounded with 0 to 100 parts of a vinyl or non-vinyl resin and 1 to 10 parts of a pigment or dye. When a developer is prepared by using such toner, the toner is generally used in an amount of 1 to 10 parts by weight per 100 parts by weight of a carrier. The toner of this invention can be used for development using a developer composed of a resin and magnetic material in which a carrier is not used.

For such toner, the magnetic material has the same effect as a colorant and therefore dye or pigment as a colorant is not required.

This invention will now be illustrated in detail by reference to the following Examples that by no means limit the scope of this invention.

EXAMPLE 1

100 parts of a copolymer composed of 65 parts of monomeric styrene and 35 parts of butyl methacrylate were mixed with 5 parts of Dia Black SH ( a pigment manufactured by Mitsubishi Kasei ) and 5 parts of Oil Black BW ( manufactured by Orient Kagaku ) as a charge controlling agent, and the mixture was blended for about 24 hours by a ball mill and kneaded by a heating roll. The kneaded mixture was cooled, pulverized and sieved to obtain a toner of a positive polarity having an average particle size of about 13 to about 15 μ ( comparative sample ).

The above procedures were repeated in the same manner as above except that 3 parts of the polyamine resin obtained in Synthesis Example 1 were added instead of Oil Black BW, to obtain a toner of a positive polarity ( sample of this invention ).

By using these two toners, two developers was prepared by incorporating 5 parts of the toner into 100 parts of an iron powder carrier having an average particle size of 50 to 80μ.

Negative electrostatic images were formed on zinc oxide photosensitive papers according to a known electrophotographic process, and these images were developed by using the above two developers according to the magnetic brush development method, to obtain toner images. These toner images were transferred onto transfer papers and fixed under heating. The transferred image formed by using the developer comprising the sample toner of this invention had a higher image density and was clearer with less fog than the transferred image formed by using the developer comprising the comparative sample toner. When transfer images were prepared continuously by using the above two developers to compare them with each other with respect to durability, it was found that in the case of the developer comprising the comparative sample toner, defects such as the reduction of the transferred image density and increase of fog became conspicuous when the copying operation was repeated 5,000 times using the developer comprising the sample toner of this invention, clear images having substantially the same quality as that of images obtained at the initial stage were obtained even after the copying operation was repeated 20,000 times.

EXAMPLE 2

100 parts of Piccolastic D-150 ( styrene resin manufactured by Esso Petrochemicals ) was mixed with 6 parts of Peares 155 ( manufactured by Columbia Carbon) and 5 parts of Methylene Blue Chloride as a charge controlling dye to form a toner of a positive polarity. This procedure was repeated in the same manner except that 5 parts of the polyamine resin obtained in Synthesis Example 2 were used instead of Methylene Blue Chloride, to form a toner of a positive polarity (sample of this invention). By using these two developers, the copying operation was conducted continuously by the magnetic brush development according to a customary electrophotographic process. In the case of the comparative sample developer, when the copying operation was conducted to obtain 10,000 copies, continuation of the copying operation became practically impossible because of increase of fog, reduction of the image density, and scattering the toner. In contrast, the sample developer of this invention, even after the copying operation was conducted to obtain 20,000 copies little fogging was caused and a clear image was obtained, the quality of which was substantially equal to the images obtained at the initial stage.

EXAMPLE 3

100 parts of Epototo 014 (epoxy resin manufactured by Toto Kasei) was mixed with 5 parts of Mogul A (carbon black manufactured by Cabot Corporation) as a pigment and 5 parts of Oil Black BW as a charge controlling dye, and the mixture was treated in the same manner as in Example 1 to obtain a toner of a positve polarity (comparative sample).

100 parts of Epototo 014 was mixed with 15 parts of the polyamine resin obtained in Synthesis Example 3 and 5 parts of Mogul A (carbon black manufactured by Cabot) as a pigment, and the mixture was treated in the same manner as in Example 1 to obtain a toner of a positive polarity (sample of this invention).

Two developers were prepared from these two toners by incorporating 2 parts of the toner into 100 parts of a carrier composed by spherical steel balls having a diameter of 500 to 600 microns. Images were prepared in the same manner as in Example 1 by changing the developing method from the magnetic brush development method to the cascade development method. In each case, clear toner images could be obtained. Then, enforced degradation was caused in these two developers by treating them for 24 hours by a ball mill having steel balls having a diameter of 10 to 15mm. Then, toner images were formed in the same manner as described above.

In the case of the sample developer, clear images free from fogs could be obtained and the image quality was substantially equal to the quality of images initially formed. However, in the comparative sample developer, the image was drastically indistinct and fog was extreme, and the developer lost its normal function.

EXAMPLE 4

85 parts of Piccolostic D-125 (styrene resin manufactured by Esso Petrochemicals) was mixed with 15 parts of Hitanol 60G (resin-modified phenilic resin manufactured by Hitachi Kasei) and 4 parts of Savon Schwarz (manufactured by Farberk Hoechst) as a charge controlling dye, and the mixture was treated in the same manner as in Example 1 to obtain a toner (comparative sample).

The above procedures were repeated in the same manner as above except that 10 parts of the polyamine resin obtained in Synthesis Example 4 was used instead of Savon Schwarz, to obtain a toner (sample of this invention).

Two developers were prepared from these two toners by incorporating 5 parts of the toner into 100 parts of an iron powder carrier having a diameter of 50 to 80 $\mu$. In the same manner as described in Example 1, transfer images were continuously formed by using zinc oxide photosensitive papers for electrophotography and the thus prepared developers. In the case of the development including the comparative sample toner, when the copying operation was repeated 5,000 times, fog was extreme and when the copying operation was repeated 10,000 times, continuation of the copying operation was substantially impossible. In contrast, in the developer including the sample toner of this invention, even after the copying operation was repeated 20,000 times, the quality of images was substantially the same as the quality of images obtained at the initial stage.

What is claimed is:

1. A toner for developing electrostatic latent images consisting essentially of an addition condensate having structural units represented by the following general formula:

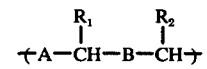

wherein $R_1$ and $R_2$ are hydrogen or lower alkyl, aryl, aralkyl or alkenyl, A is a group

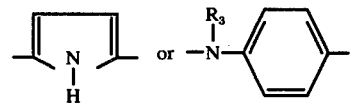

in which $R_3$ is the same as $R_1$ and $R_2$, and B is a group

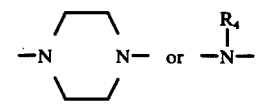

in which $R_4$ is the same as $R_1$ and $R_2$, and a colorant selected from the group consisting of a pigment, a dye, and a magnetic material, wherein said addition condensate is present in an amount of from 1 to 100 parts by weight and said colorant in an amount of from 1 to 10 parts by weight of said toner, said addition condensate, having an intrinsic viscosity measured at 25° C., of 0.03 to 0.20.

2. The toner of claim 1 wherein said colorant is one of black, cyan, magenta and yellow dyes or pigments.

3. The toner of claim 1, further comprising at least one resin selected from the group consisting of a vinyl resin, coumarone-indene resin, rosin-modified phenolic resin, oil-modified epoxy resin and polyether resin.

4. The toner of claim 3 wherein said addition condensate is present in an amount of 1 to 100 parts by weight, said resin in an amount of up to 100 parts by weight, and said colorant in an amount of 1–10 parts by weight, of said toner.

* * * * *